(12) United States Patent
Finn et al.

(10) Patent No.: US 9,950,815 B2
(45) Date of Patent: Apr. 24, 2018

(54) SYSTEMS AND METHODS FOR DETECTING DAMAGE

(71) Applicant: UNITED TECHNOLOGIES CORPORATION, Farmington, CT (US)

(72) Inventors: Alan Matthew Finn, Hebron, CT (US); Srinivas Ravela, Belmont, MA (US); Joseph A. Sylvestro, Avon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 68 days.

(21) Appl. No.: 15/201,176

(22) Filed: Jul. 1, 2016

(65) Prior Publication Data

US 2018/0002039 A1 Jan. 4, 2018

(51) Int. Cl.
| | | |
|---|---|---|
| *B64F 5/60* | (2017.01) | |
| *G07C 5/00* | (2006.01) | |
| *G07C 5/08* | (2006.01) | |
| *G06T 7/33* | (2017.01) | |

(52) U.S. Cl.
CPC ............... *B64F 5/60* (2017.01); *G06T 7/344* (2017.01); *G07C 5/006* (2013.01); *G07C 5/0808* (2013.01)

(58) Field of Classification Search
CPC ........... B64F 5/60; G06T 7/344; G07C 5/006; G07C 5/0808
See application file for complete search history.

(56) References Cited

U.S. PATENT DOCUMENTS

| | | | | |
|---|---|---|---|---|
| 5,619,429 A * | 4/1997 | Aloni | ............... | G01N 21/95607 |
| | | | | 382/141 |
| 7,489,811 B2 * | 2/2009 | Brummel | ........... | G01N 21/8806 |
| | | | | 382/152 |
| 7,518,632 B2 * | 4/2009 | Konomura | ........... | G01N 21/954 |
| | | | | 348/45 |
| 7,564,626 B2 * | 7/2009 | Bendall | ................ | A61B 1/0005 |
| | | | | 359/462 |
| 2002/0128790 A1 * | 9/2002 | Woodmansee | .......... | B23P 6/002 |
| | | | | 702/81 |
| 2004/0183900 A1 * | 9/2004 | Karpen | .............. | G01N 21/8803 |
| | | | | 348/92 |
| 2004/0242961 A1 * | 12/2004 | Bughici | ................... | A61B 1/07 |
| | | | | 600/108 |

(Continued)

FOREIGN PATENT DOCUMENTS

EP 2703776 3/2014

OTHER PUBLICATIONS

EP Search report dated Sep. 28, 2017 in EP Application No. 17178402.8.

*Primary Examiner* — Calvin Cheung
(74) *Attorney, Agent, or Firm* — Snell & Wilmer L.L.P.

(57) ABSTRACT

A system and method of detecting damage to a component may include a first sensor and a processor. The method may include the steps of receiving, by the processor, a first data for the component from a first sensor, aligning, by the processor, the first data with a reference model, determining, by the processor, a feature dissimilarity between the first data and the reference model, classifying, by the processor, the feature dissimilarity, and determining, by the processor, a probability that the feature dissimilarity indicates damage to the component.

16 Claims, 6 Drawing Sheets

(56) References Cited

U.S. PATENT DOCUMENTS

| | | | |
|---|---|---|---|
| 2013/0114878 A1* | 5/2013 | Scheid | G06T 7/001 382/141 |
| 2014/0185912 A1 | 7/2014 | Lim | |
| 2015/0066411 A1* | 3/2015 | Blanton | G01B 11/2518 702/82 |
| 2017/0068756 A1* | 3/2017 | Wilsher | G06F 17/509 |

* cited by examiner

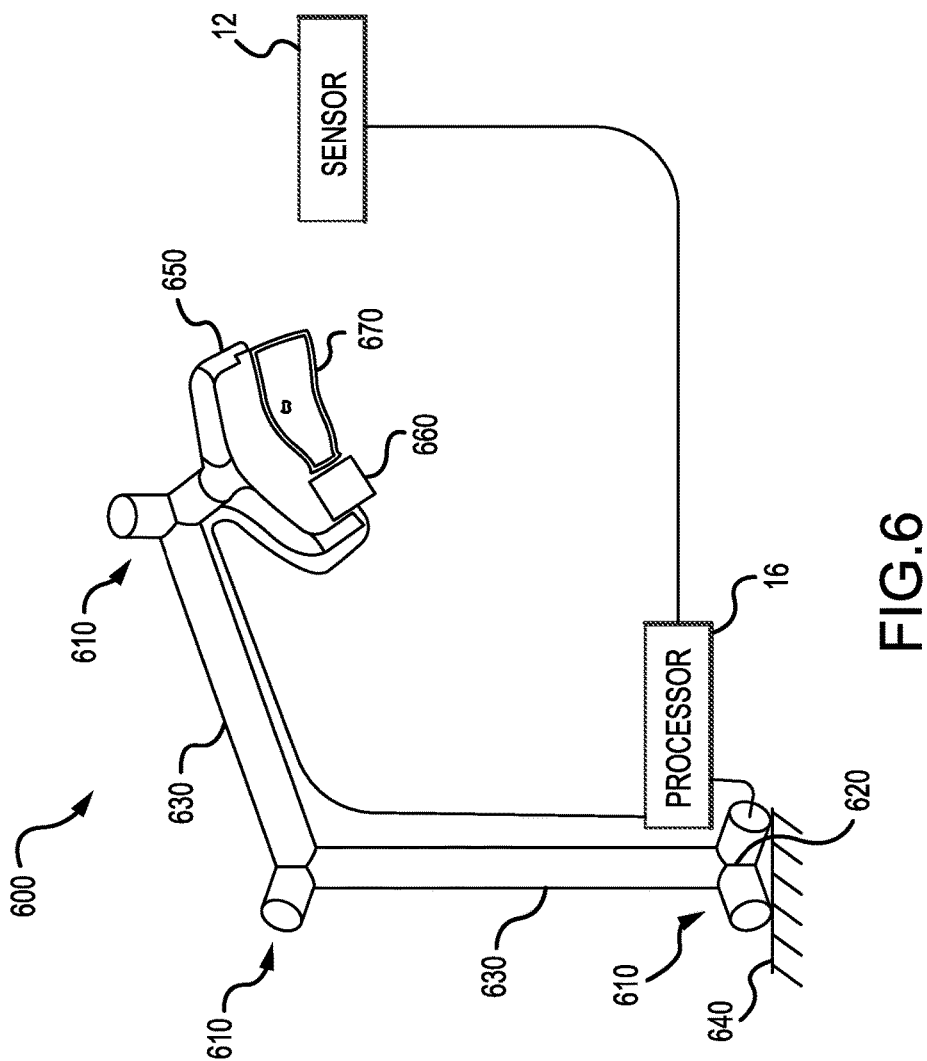

SYSTEMS AND METHODS FOR DETECTING DAMAGE

FIELD

The present disclosure relates to aircraft systems, and, more specifically, to aircraft part inspection systems.

BACKGROUND

Gas turbine engine components, such as blades, may suffer wear and damage during operation, for example, due to erosion, hot corrosion (sulfidation), cracks, dents, nicks, gouges, and other damage, such as from foreign object damage. Detecting this damage may be achieved by images or videos for aircraft engine blade inspection, power turbine blade inspection, internal inspection of mechanical devices, and the like. A variety of techniques for inspecting by use of images or videos may include capturing and displaying images or videos to human inspectors for manual defect detection and interpretation. Human inspectors may then decide whether any defect exists within those images or videos. When human inspectors look at many similar images of very similar blades of an engine stage or like components of a device, they may not detect defects, for example, because of fatigue or distraction experienced by the inspector. Missing a defect may lead to customer dissatisfaction, transportation of an expensive engine back to service centers, lost revenue, or even engine failure. Additionally, manual inspection of components may be time consuming.

SUMMARY

Systems for detecting damage to a component are disclosed herein. A damage detection system may comprise a first sensor and tangible, non-transitory memory configured to communicate with a processor. The tangible, non-transitory memory having instructions stored thereon that, in response to execution by the processor, cause the processor to perform operations. The operations may include receiving, by the processor, a first data for a component from the first sensor. The operations may include aligning, by the processor, the first data with a reference model. The operations may include determining, by the processor, a feature dissimilarity between the first data and the reference model. The operations may include classifying, by the processor, the feature dissimilarity. The operations may include determining, by the processor, a probability that the feature dissimilarity indicates damage to the component.

In various embodiments, the aligning, by the processor, the first data with the reference model further comprises generating, by the processor, three-dimensional (3D) information from the first data, the 3D information corresponding to the component, and aligning, by the processor, the 3D information with the reference model. The reference model may include a three-dimensional (3D) reference model. The first sensor may comprise a depth sensor. The damage detection system may comprise a second sensor. The operations may further include receiving, by the processor, a second data for the component from the second sensor. The first sensor may comprise a two-dimensional sensor and the second sensor may comprise an inertial measurement unit. The reference model may include a two-dimensional (2D) reference model.

An article of manufacture may include a non-transitory, tangible computer readable storage medium having instructions stored thereon that, in response to execution by a processor, cause the processor to perform operations. The operations may include receiving, by the processor, a first data for a component from a first sensor. The operations may include aligning, by the processor, the first data with a reference model. The operations may include determining, by the processor, a feature dissimilarity between the first data and the reference model. The operations may include classifying, by the processor, the feature dissimilarity. The operations may include determining, by the processor, a probability that the feature dissimilarity indicates damage to the component.

In various embodiments, the aligning, by the processor, the first data with the reference model may further comprise generating, by the processor, three-dimensional (3D) information from the first data, the 3D information corresponding to the component, and aligning, by the processor, the 3D information with the reference model. The 3D information may comprise at least one of a 3D point cloud, a model derived from the 3D point cloud, a focal stack, or a depth map. The operations may include receiving, by the processor, a second data for the component from a second sensor. The generating the 3D information may further comprise merging, by the processor, the first data and the second data. The operations may include receiving, by the processor, a second data for the component from a second sensor. The second sensor may include an inertial measurement unit. The operations may include updating, by the processor, the reference model based on the feature dissimilarity.

A method of detecting damage to a component of an aircraft may comprise the steps of receiving, by a processor, a first data for a component from a first sensor. The operations may include aligning, by the processor, the first data with a reference model. The operations may include determining, by the processor, a feature dissimilarity between the first data and the reference model. The operations may include classifying, by the processor, the feature dissimilarity. The operations may include determining, by the processor, a probability that the feature dissimilarity indicates damage to the component.

In various embodiments, the aligning, by the processor, the first data with the reference model may further comprise generating, by the processor, three-dimensional (3D) information from the first data, the 3D information corresponding to the component, and aligning, by the processor, the 3D information with the reference model. The method may further include receiving, by the processor, a second data for the component from a second sensor. The generating the 3D information may further comprise merging, by the processor, the first data and the second data. The 3D information may comprise at least one of a 3D point cloud, a model derived from the 3D point cloud, a focal stack, or a depth map. The method may further include receiving, by the processor, a second data for the component from a second sensor, and wherein the second sensor includes an inertial measurement unit. The method may further include generating, by the processor, the reference model as a two-dimensional (2D) reference model based on a three-dimensional (3D) reference model and the second data from the inertial measurement unit. The method may further include updating, by the processor, the reference model based on the feature dissimilarity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 6 illustrates a schematic view of an automated damage detection system, in accordance with various embodiments.

DETAILED DESCRIPTION

Figure 1:
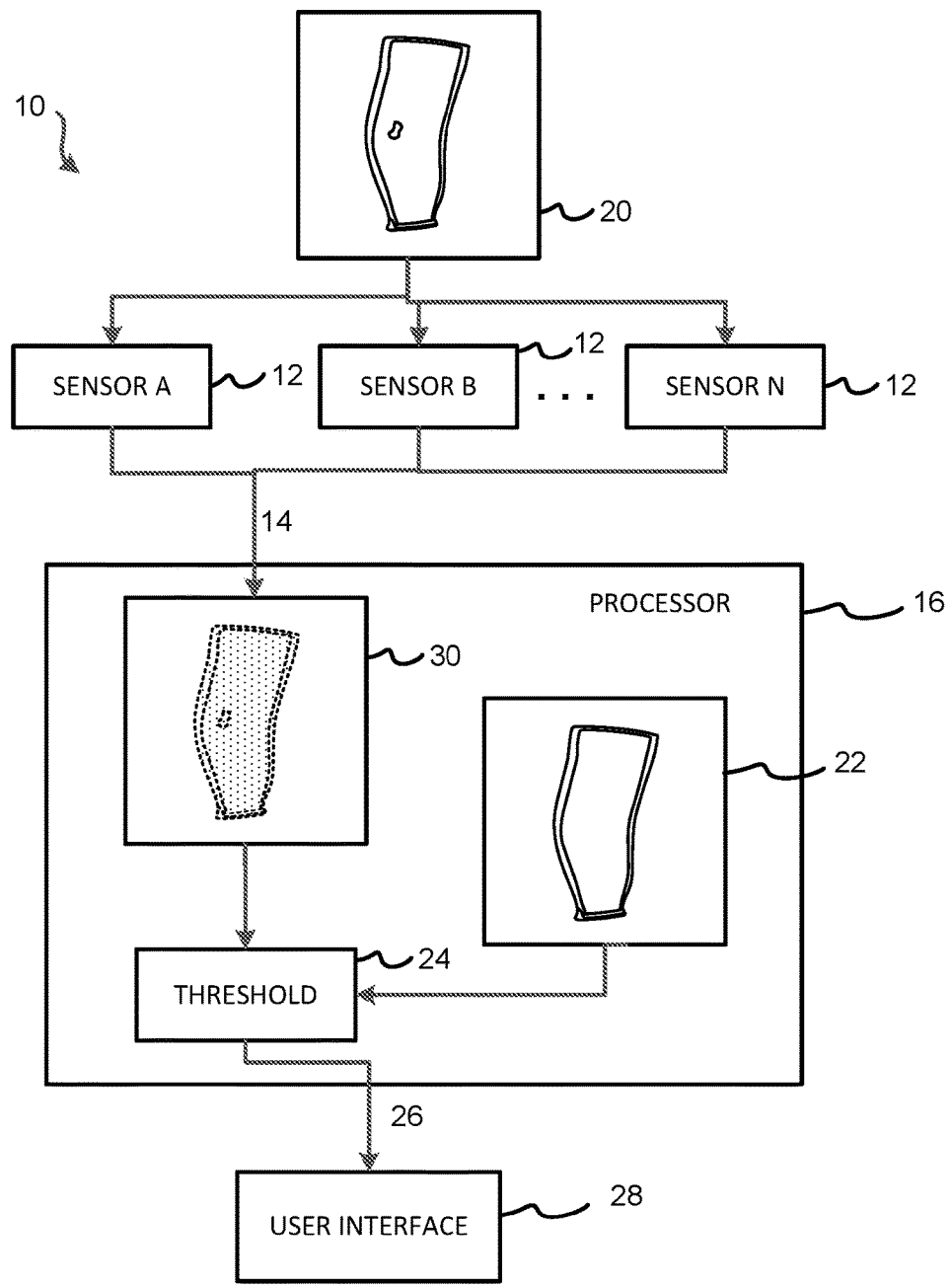
FIG. 1 illustrates a schematic view of an automated damage detection system, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

System program instructions and/or controller instructions may be loaded onto a tangible, non-transitory computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In general, the present disclosure sets forth systems and methods for performing automated defect detection of aircraft components and the like. One or more sensors may sense or scan the component, which may be, for example, a fan blade, a compressor blade, a vane, or other component of a system or machine. The system may generate three-dimensional (3D) information, such as depth information, from data received from the one or more sensor(s). The 3D information may be aligned or compared with a reference model stored by the system. The reference model may be based on a design model, such as a computer-aided drafting (CAD) model, stored image or 3D information from an original or undamaged component, and/or stored information from previous inspections of the component or similar components. Upon comparing the 3D information to the reference model, features of the component may be identified. If the features of the component deviate from the reference model, the deviations, dissimilarities, or differences may be classified and expressed as a probability of damage or evaluated against a threshold. The system may display an output corresponding to the determined damage, such as a "heat map" of the probability of damage, a "bounding box" outlining a damage area, an indication that the component may be rejected based on the damage, a displayed image of the damaged component for further evaluation by a user, or the like. Further, the system may update the reference model based on the features of the component from the current inspection.

In general, the method of detecting damage may comprise comparing 3D information about a component being inspected to 3D information about the as-designed, as-built, or as-used, but undamaged, component. The 3D information about the as-designed, as-built, or as-used, but undamaged, component may be referred to as a 3D reference model. In various embodiments, the method may compare two-dimensional (2D) information about the particular component being inspected along with additional information about the position and orientation of the component to a projection of the 3D reference model, wherein the projection of the 3D reference model is based on the position and orientation information of the component. The projection of the 3D reference model may be a 2D reference model. Thus, a reference model may include 2D and/or 3D reference information and may be a 2D reference model or a 3D reference model. In various embodiments, the method may also directly compare 2D information about the particular component being inspected to a 2D reference model or a 3D reference model. The comparing of 2D information to a 2D reference model or a 3D reference model may include comparing an edge, a parameterized function representing an edge, and the like in the 2D information to an edge, a parameterized function representing an edge, and the like in the 2D reference model or the 3D reference model.

Referring to FIG. 1, a schematic illustration of an automated damage detection system 10 for detecting a defect or damage to a component 20 is shown, in accordance with various embodiments. Damage detection system 10 may be configured to perform 3D imaging of a component 20. Component 20 may include a component of an aircraft, such as an engine component such as an airfoil (e.g., a fan blade or vane). Component 20 may be scanned or sensed by one or more sensors 12 to obtain data 14 about the component 20. Data 14 may be obtained, for example, from a single 3D sensor. In various embodiments, data 14 may be obtained by rotating or positioning the sensor(s) 12 relative to the component 20 to capture data 14 from multiple viewpoint angles, perspectives, and/or depths. Further, the component 20 may be rotated or positioned relative to the sensor(s) 12 to obtain data 14 from multiple viewpoints, perspectives, and/or depths. An array of sensors 12 positioned around component 20 may be used to obtain data 14 from multiple viewpoints. Thus, either of the sensor(s) 12 or component 20 may be moved or positioned relative to the other and relative to various directions or axes of a coordinate system to obtain sensor information from various viewpoints, perspectives, and/or depths. Further, sensor 12 may scan, sense, or capture information from a single position relative to component 20.

A sensor 12 may include a one-dimensional (1D), 2D, 3D sensor and/or a combination and/or array thereof. Sensor 12 may be operable in the electromagnetic or acoustic spectrum capable of producing a 3D point cloud, occupancy grid or depth map of the corresponding dimension(s). Sensor 12 may provide various characteristics of the sensed electromagnetic or acoustic spectrum including intensity, spectral characteristics, polarization, etc. In various embodiments, sensor 12 may include a distance, range, and/or depth sensing device. Various depth sensing sensor technologies and devices include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, echolocation, laser radar, scanning light detection and ranging (LIDAR), flash LIDAR, or a combination comprising at least one of the foregoing. Different technologies can include active (transmitting and receiving a signal) or passive (only receiving a signal) and may operate in a band of the electromagnetic or acoustic spectrum such as visual, infrared, ultrasonic, etc. In various embodiments, sensor 12 may be operable to produce depth from defocus, a focal stack of images, or structure from motion.

In various embodiments, sensor 12 may include an image capture device, such as an optical device having an optical lens, such as a camera, or other imaging device or image sensor, capable of capturing 2D still images or video images. Sensor 12 may include two or more physically separated cameras that may view a component from different angles, to obtain visual stereo image data.

In various embodiments, sensor 12 may include a structured light sensor, a line sensor, a linear image sensor, or other 1D sensor. Further, sensor 12 may include a 2D sensor, and damage detection system 10 may extract 1D information from the 2D sensor data. Even further, sensor 12 may include a position and/or orientation sensor such as an inertial measurement unit (IMU) that may provide position and/or orientation information about component 20 with respect to a coordinate system or other sensor 12. The position and/or orientation information may be beneficially employed in aligning 1D, 2D or 3D information to a reference model as discussed elsewhere herein.

Data 14 from sensor(s) 12 may be transmitted to one or more processors 16 (e.g., computer systems having a central processing unit and memory) for recording, processing and storing the data received from sensors 12. Processor 16 may include a general purpose processor, a digital signal processor (DSP), an application specific integrated circuit (ASIC), a field programmable gate array (FPGA) or other programmable logic device, discrete gate or transistor logic, discrete hardware components, or any combination thereof. Processor 16 may be in communication (such as electrical communication) with sensors 12 and may be configured to receive input, such as images and/or depth information from sensors 12. Processor 16 may receive data 14 about component 20 captured and transmitted by the sensor(s) 12 via a communication channel. Upon receiving the data 14, the processor 16 may process data 14 from sensors 12 to determine if damage or defects are present on the component 20.

In various embodiments, processor 16 may receive or construct 3D information 30 corresponding to the component 20. Processor 16 may further include a reference model 22 stored, for example, in memory of processor 16. Reference model 22 may be generated from a CAD model, a 3D CAD model, and/or 3D information, such as from a 3D scan or 3D information of an original component or an undamaged component. Reference model 22 may be a theoretical model, or may be based on historical information about component 20. Reference model 22 may be adjusted and updated as component 20 and/or similar components are scanned and inspected. Thus, reference model 22 may be a learned model of a component and may include, for example, 3D information including shape and surface features of the component.

In various embodiments, processor 16 of damage detection system 10 may classify the damage and determine the probability of damage and/or if the damage meets or exceeds a threshold 24. Threshold 24 may be an input parameter based on reference model 22 and/or user input. Processor 16 may provide an output 26 to a user interface 28 indicating the status of the component 20. User interface 28 may include a display. Damage detection system 10 may display an indication of the damage to component 20, which may include an image and/or a report. In addition to reporting any defects in the component, output 26 may also relay information about the type of defect, the location of the defect, size of the defect, etc. If defects are found in the inspected component 20, an indicator may be displayed on user interface 28 to alert personnel or users of the defect.

Figure 2:
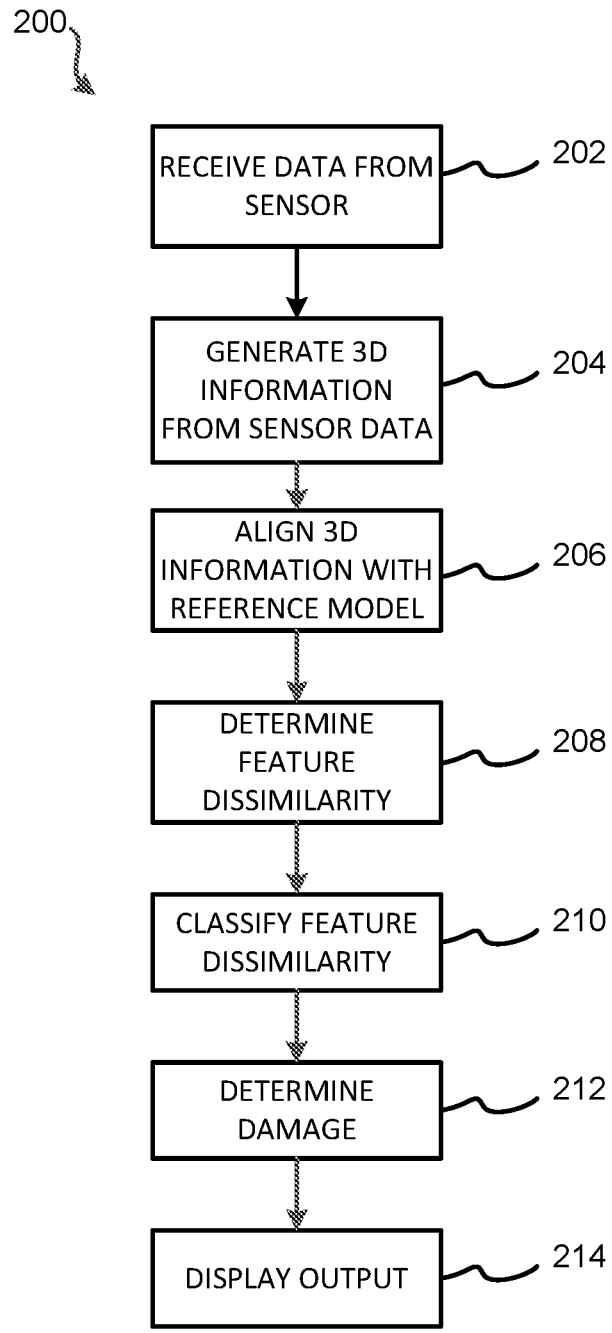
FIG. 2 illustrates a process of automated damage detection, in accordance with various embodiments.

With reference to FIG. 2, a method 200 for detecting defects is provided, in accordance with various embodiments. Processor 16 may be capable of carrying out the steps of FIG. 2. One or more sensors 12 may capture data about a component 20. Method 200, performed by processor 16 of damage detection system 10, may include receiving data from a sensor (step 202). Method 200 may include generating 3D information from the sensor data (step 204). The 3D information may correspond to the component. Method 200 may include aligning the 3D information with a reference model (step 206), determining a feature dissimilarity between the 3D information and the reference model (step 208), classifying the feature dissimilarity (step 210), determining damage (step 212), and displaying an output (step 214).

Step 202 may further comprise receiving 1D, 2D, and/or 3D data from a sensor 12. In various embodiments, 3D information is received from one or more sensors 12, which may be 3D sensors. In receiving data 14 from a 3D sensor, the damage detection system 10 may capture depth points of component 20 and recreate precisely, the actual 3D surfaces of component 20, thereby generating a complete 3D point cloud or a partial 3D point cloud.

Step 204 may comprise producing a 3D point cloud or occupancy grid, a partial 3D point cloud, a model derived from a 3D point cloud, depth map, other depth information, 1D information and/or 2D information. A 3D point cloud or occupancy grid may include a plurality of points or coordinates in a coordinate system having three dimensions, such as an xyz coordinate system or polar coordinate system. A partial 3D point cloud may include a plurality of points or coordinates in a 3D coordinate system, where the sensor data is collected from a single viewpoint or a limited viewpoint. A model derived from a 3D point cloud may include a modified 3D point cloud which has been processed to connect various points in the 3D point cloud in order to approximate or functionally estimate the topological surface of the component. A depth map may reflect points from a 3D point cloud that can be seen from a particular viewpoint. A depth map may be created by assuming a particular viewpoint of a 3D point cloud in the coordinate system of the 3D point cloud.

Step 204 may further comprise constructing a complete image or 3D point cloud of the component 20 by mosaicking information from multiple sensors 12 or multiple viewpoints. Step 204 may comprise merging data 14 from multiple viewpoints. In various embodiments, step 204 may comprise merging a first data from a 1D sensor and a second data from a 2D sensor and processing the 1D and 2D data to produce 3D information 30.

In various embodiments, step 204 may comprise computing first data from a first 2D sensor and second data from a second 2D sensor. Processor 16 may receive a plurality of 2D sensor data and merge the 2D sensor data to generate a focal stack of 2D sensor data. The focal stack, i.e. multiple layers of 2D sensor data, may produce a volume of data to form the 3D information 30, which may be a 3D representation of the component.

Step 206 may further comprise of aligning the 3D information, such as a 3D point cloud, by an iterative closest point (ICP) algorithm modified to suppress misalignment from damage areas of the component 20. The alignment may be performed by an optimization method, i.e., minimizing an objective function over a dataset, which may include mathematical terms in the ICP objective function or constraints to reject features or damage as outliers. The alignment may be performed by a 3D modification to a random sample consensus (RANSAC) algorithm, scale-invariant feature transform (SIFT), speeded up robust feature (SURF), other suitable alignment method. Step 206 may further include comparing the 3D information 30 to the reference model 22 to align the features from the 3D information 30 with the reference model 22 by identifying affine and/or scale invariant features, diffeomorphic alignment/scale cascaded alignment, and the like. Step 206 may further include registering the features.

Step 208 may further comprise computing features, such as surface and shape characteristics, of the component 20 by methods to identify and extract features. For example, processor 16 may determine differences or dissimilarities between the 3D information 30 and the reference model 22. Step 208 may further comprise identifying features and determining differences or dissimilarities between the identified features in the 3D information 30 and the reference model 22 using a statistical algorithm such as a histogram of oriented gradients in 3D (HoG3D), 3D Zernike moments, or other algorithms. In a HoG3D method, processor 16 may define the orientation of edges and surfaces of 3D information 30 by dividing the 3D information 30 into portions or cells and assigning to each cell a value, where each point or pixel contributes a weighted orientation or gradient to the cell value. By grouping cells and normalizing the cell values, a histogram of the gradients can be produced and used to extract or estimate information about an edge or a surface of the component 20. Thus, the features of the 3D information 30, such as surface and edge shapes, may be identified. Other algorithms, such as 3D Zernike moments, may similarly be used to recognize features in 3D information 30 by using orthogonal moments to reconstruct, for example, surface and edge geometry of component 20. Step 208 may further comprise determining differences or dissimilarities between the identified features in the 3D information 30 and the reference model 22. The dissimilarities may be expressed, for example, by the distance between two points or vectors. Other approaches to expressing dissimilarities may include computing mathematical models of 3D information 30 and reference model 22 in a common basis (comprising modes) and expressing the dissimilarity as a difference of coefficients of the basis functions (modes). Differences or dissimilarities between the 3D information 30 and the reference model 22 may represent various types of damage to component 20.

Step 210 may further comprise classifying the feature dissimilarities identified in step 208. Damage detection system 10 may include categories of damage or defect types for component 20. For example, damage may be categorized into classes such as warping, stretching, edge defects, erosion, nicks, cracks, and/or cuts. Step 210 may further comprise identifying the damage type based on the dissimilarities between the 3D information 30 and the reference model 22. Step 210 may further comprise classifying the feature dissimilarities into categories of, for example, systemic damage or localized damage. Systemic damage may include warping or stretching of component 20. Localized damage may include edge defects, erosion, nicks, cracks, or cuts on a surface of component 20. Classifying the feature dissimilarities may be accomplished by, for example, support vector machine (SVM), decision tree, deep neural network, recurrent ensemble learning machine, or other classification method.

Step 212 may further comprise determining whether the feature difference or dissimilarity represents damage to component 20. Step 212 may comprise determining a probability of damage represented by the feature dissimilarity and/or classification. Step 212 may comprise determining damage by comparing the probability of damage to a threshold. Damage may be determined if the probability meets or exceeds a threshold. Damage detection system 10 may determine if the damage is acceptable or unacceptable, and may determine if the component 20 should be accepted or rejected, wherein a rejected component would indicate that the component should be repaired or replaced.

Step 214 may further comprise transmitting or displaying the 3D information, feature differences or dissimilarities, classification of the feature differences or dissimilarities, a damage report, and/or a determination or recommendation that the component 20 be accepted or rejected. Step 214 may further comprise displaying an image, a 3D model, a combined image and 3D model, a 2D perspective from a 3D model, and the like, of the damaged component for further evaluation by a user or by a subsequent automated system.

Figure 3:
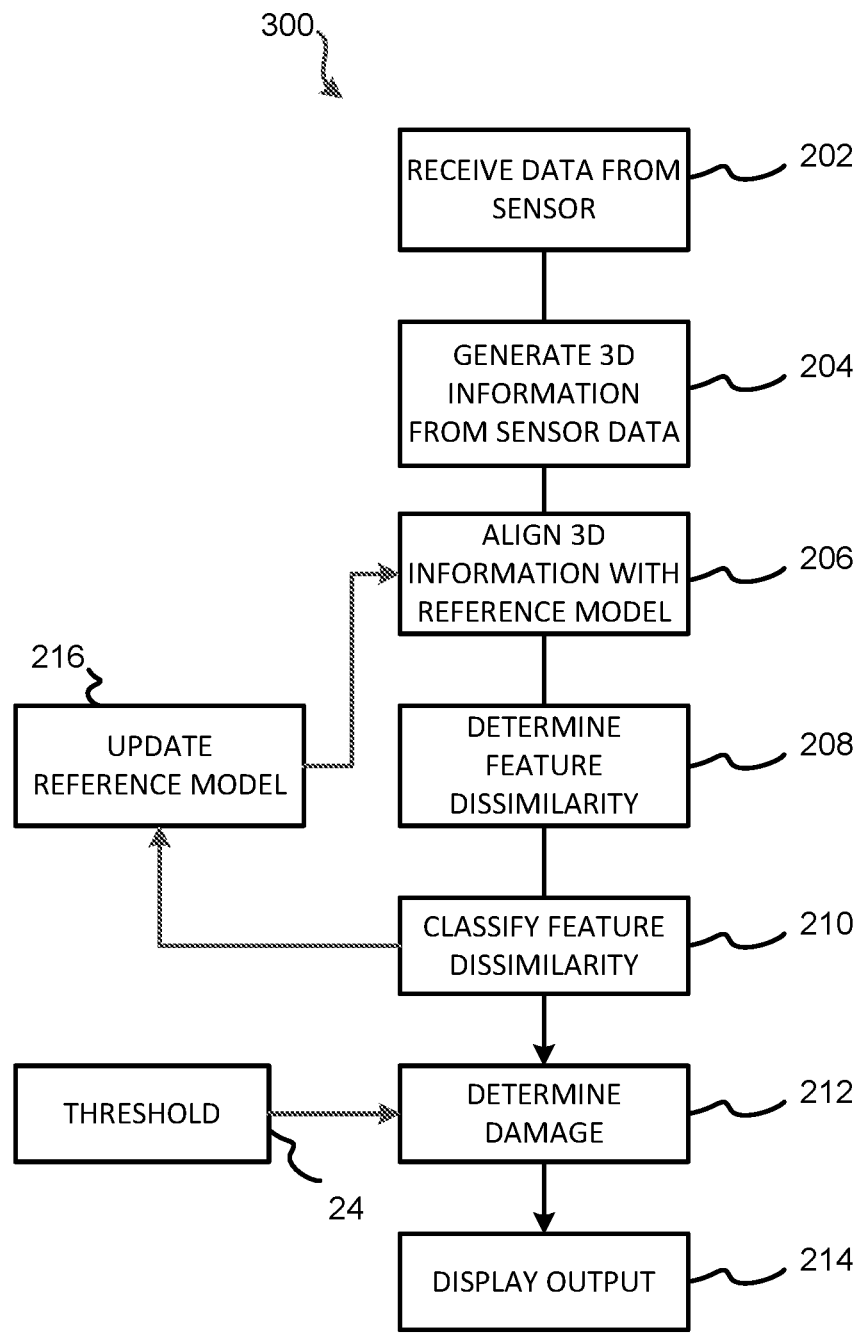
FIG. 3 illustrates a process of automated damage detection, in accordance with various embodiments.

With reference to FIG. 3, a method 300 for detecting defects is provided, in accordance with various embodiments. Method 300, which comprises steps also found in method 200, may further comprise a step 216 of updating the reference model (step 216). Step 216 may further include updating the reference model based on the component features. The reference model 22 may be learned automatically by damage detection system 10. For example, damage detection system 10 may collect and store historical data, such as 3D information 30 from past scans of component 20 or similar components. Damage detection system 10 may select and merge 3D information 30 into reference model 22, for example, by using robust principal components analysis and the like. Updating reference model 22 allows damage detection system 10 to incorporate allowable damage into reference model 22 to reduce the likelihood of damage detection system 10 rejecting a component with damage that is acceptable. Thus, damage detection system 10 tends to accurately reject components 20 having unacceptable damage.

Step 212 may comprise determining whether the feature difference or dissimilarity represents damage to component 20. Step 212 may comprise determining a probability of damage represented by the feature dissimilarity, and comparing the probability of damage to a threshold 24. Additionally, step 212 may further comprise determining if the damage or probability of damage is beyond a threshold 24. Threshold 24 may be an input parameter based on reference model 22 and/or user input. Damage may be determined if the probability meets or exceeds a threshold 24. Damage detection system 10 may determine if the damage is acceptable or unacceptable, and may determine if the component 20 should be accepted or rejected, wherein a rejected component would indicate that the component should be repaired or replaced.

Figure 4:
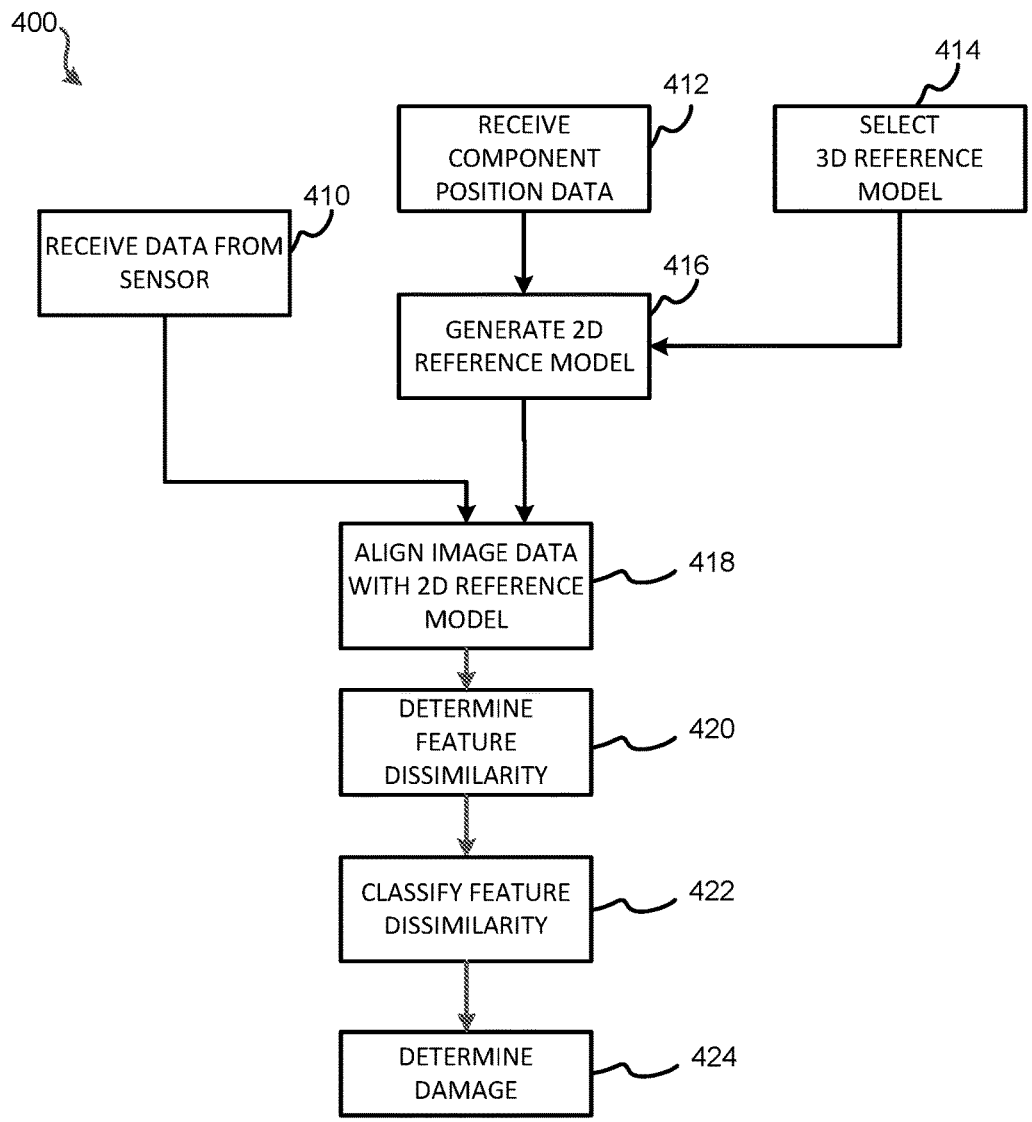
FIG. 4 illustrates a process of automated damage detection, in accordance with various embodiments.

With reference to FIG. 4, a method 400 for detecting defects is provided, in accordance with various embodiments. Processor 16 may be capable of carrying out the steps of FIG. 4. Method 400, performed by processor 16 of damage detection system 10, may include receiving data from a sensor (step 410), receiving component position data (step 412), selecting a 3D reference model (step 414), generating a 2D reference model (step 416), aligning the image data with the 2D reference model (step 418), determining a feature dissimilarity (step 420), classifying the feature dissimilarity (step 422), and determining damage (step 424).

Step 410 may comprise receiving 2D image data from sensor 12. Step 412 may further comprise receiving position and/or orientation data, such as from a sensor or IMU from a manipulator system 600 (see FIG. 6). Step 414 may further comprise selecting, receiving, or generating a 3D reference model. The 3D reference model may be suitable for comparison to 2D data received in step 410 using position and/or orientation data received in step 412.

Step 416 may further comprise generating a 2D reference model from the 3D reference model by projecting data from the 3D reference model, such as by orthographic projection according to the position and/or orientation data. The projection may be expressed by scaling, translation, and rotation matrices that are a function of the relative position and orientation of the component with respect to the 3D reference model. Thus, the 2D reference model may be based on the 3D reference model (from step 414) and position and/or orientation data from a sensor or IMU (from step 412).

Step 418 may further comprise aligning or registering the 2D image data from step 410 to the 2D reference model generated in step 416. The alignment may be performed by an algorithm such as RANSAC, SIFT, SURF, ASIFT, diffeomorphic alignment/scale cascaded alignment, and the like.

Step 420 may further comprise determining a feature difference or dissimilarity between the aligned 2D image data (from step 410) and the 2D reference model (from step 416) by computing features, such as surface and shape characteristics, of the component 20 by methods to identify and extract features. For example, processor 16 may determine differences or dissimilarities between the aligned image data, which may be 2D data, and reference model, which may be a 2D reference model. Step 420 may further comprise identifying features and determining differences or dissimilarities between the identified features using a statistical algorithm such as a histogram of oriented gradients (HoG), Zernike moments, or other algorithms. The differences or dissimilarities may be expressed, for example, by the distance between two points or vectors. Other approaches to expressing differences may include computing mathematical models for instance expressing the difference as the optical flow from the image to the model.

Step 422 may further comprise classifying the feature differences or dissimilarities identified in step 420. Damage detection system 10 may include categories of damage or defect types for component 20. For example, damage may be categorized into classes such as warping, stretching, edge defects, erosion, nicks, cracks, and/or cuts. Step 422 may further comprise classifying the feature differences or dissimilarities into categories of, for example, systemic damage or localized damage. Systemic damage may include warping or stretching of component 20. Localized damage may include edge defects, erosion, nicks, cracks, or cuts on a surface of component 20. Classifying the feature differences or dissimilarities may be accomplished by, for example, SVM, decision tree, deep neural network, recurrent ensemble learning machine, or other classification method.

Step 424 may further comprise determining whether the feature dissimilarity represents damage to component 20 by comparing the feature dissimilarity to a threshold. Damage may be determined if the feature dissimilarity meets or exceeds a threshold. Step 424 may further comprise determining a probability of damage represented by the feature dissimilarity and/or classification. Step 424 may comprise determining damage by comparing the probability of damage to a threshold. Damage may be determined if the probability meets or exceeds a threshold. Damage detection system 10 may determine if the damage is acceptable or unacceptable, and may determine if the component 20 should be accepted or rejected, wherein a rejected component would indicate that the component should be repaired or replaced.

Figure 5:
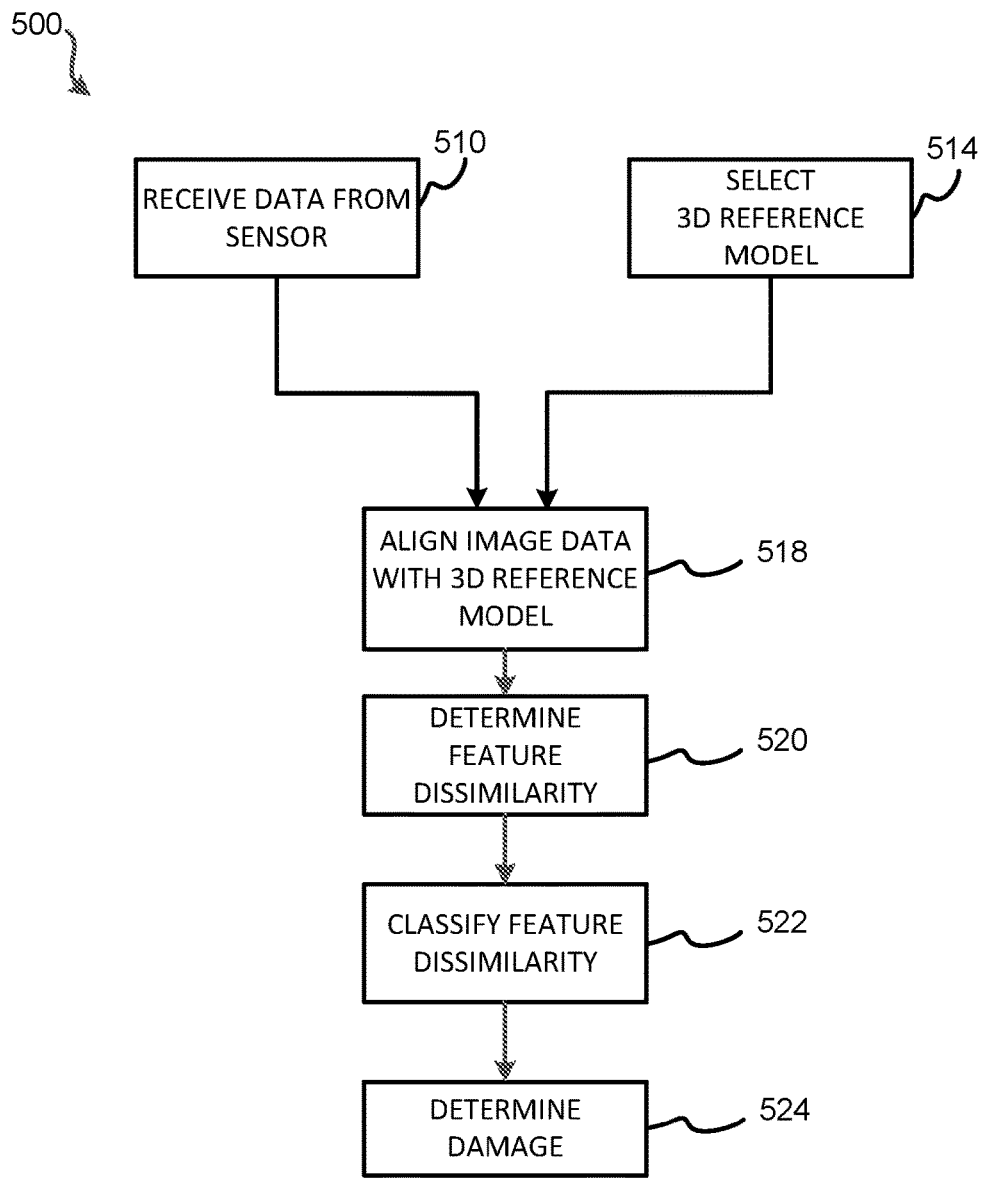
FIG. 5 illustrates a process of automated damage detection, in accordance with various embodiments.

With reference to FIG. 5, a method 500 for detecting defects is provided, in accordance with various embodiments. Processor 16 may be capable of carrying out the steps of FIG. 5. Method 500, performed by processor 16 of damage detection system 10, may include receiving data from a sensor (step 510), selecting a 3D reference model (step 514), aligning the image data with the 3D reference model (step 518), determining a feature dissimilarity (step 520), classifying the feature dissimilarity (step 522), and determining damage (step 524).

A step 510 may comprise receiving 2D image data from sensor 12. Step 514 may further comprise selecting, receiving, or generating a 3D reference model suitable for comparison to 2D data received in step 510. Step 518 may further comprise aligning (or registering) the 2D image data from step 510 to the 3D reference model from step 514. The alignment may be performed by an optimization method, i.e., minimizing an objective function over a dataset, wherein the parameters for the optimization method may include a position and orientation of the component and an objective function may be a difference between the 2D image data of the component and an orthographic projection of the 3D reference model according to the position and orientation of the component.

Step 520 may further comprise determining a feature dissimilarity between the aligned 2D image data (from step 518) and 3D reference model (from step 514) by computing features, such as surface and shape characteristics, of the component 20 by methods to identify and extract features. For example, processor 16 may determine differences or dissimilarities between the aligned 2D image data and 3D reference model. Step 520 may further comprise identifying features and determining differences or dissimilarities between the identified features using a statistical algorithm such as a HoG, Zernike moments or other algorithms. The differences or dissimilarities may be expressed, for example, by the distance between two points or vectors. Other approaches to expressing differences may include computing mathematical models for instance expressing the difference as the optical flow from the image to the model.

Step 522 may further comprise classifying the feature differences or dissimilarities identified in step 520. Damage detection system 10 may include categories of damage or defect types for component 20. For example, damage may be categorized into classes such as warping, stretching, edge defects, erosion, nicks, cracks, and/or cuts. Step 522 may further comprise classifying the feature differences into categories of, for example, systemic damage or localized damage. Systemic damage may include warping or stretching of component 20. Localized damage may include edge defects, erosion, nicks, cracks, or cuts on a surface of component 20. Classifying the feature differences may be accomplished by, for example, SVM, decision tree, deep neural network, recurrent ensemble learning machine, or other classification method.

Step 524 may further comprise determining whether the feature difference represents damage to component 20 by comparing the feature dissimilarity to a threshold. Damage may be determined if the feature dissimilarity meets or exceeds a threshold. Step 524 may further comprise determining a probability of damage represented by the feature dissimilarity and/or classification. Step 524 may comprise determining damage by comparing the probability of damage to a threshold. Damage may be determined if the probability meets or exceeds a threshold. Damage detection system 10 may determine if the damage is acceptable or unacceptable, and may determine if the component 20 should be accepted or rejected, wherein a rejected component would indicate that the component should be repaired or replaced.

With reference to FIG. 6, a schematic illustration of a manipulator system 600 for providing position and/or orientation information is shown, in accordance with various embodiments. In various embodiments, manipulator system 600 may comprise a force feedback manipulator and may provide position and orientation of a component 670 under inspection. Manipulator system 600 may include a gripper or stage 650 and an IMU 660. Manipulator system 600 may comprise one or more linkages 630 coupled by one or more joints 610, which may be 2-axis joints, or 3-axis joints, spherical joints, or other joints. Manipulator system 600 may include one or more sensors 620 coupled to joints 610. Each joint 610 may include one or more sensors 620. Sensors 620 may include position sensors or other suitable sensors. For example, as 2-axis joint 610 may have two sensors 620, and similarly, a 3-axis joint 610 may have three sensors 620. Each sensor 620 may connected to one or more processors 16. Manipulator system 600 is illustrated in FIG. 6, for example, as having one processor 16. Manipulator system 600 may be coupled to a mounting surface 640, such as a table or a workbench, at a joint 610. Manipulator system 600 may include gripper or stage 650 at an end of linkages 630 opposite to mounting surface 640. Gripper or stage 650 may hold an IMU 660, which may be further coupled to component 670. IMU 660 may be in communication (e.g., wired or wirelessly coupled) with processor 16. In various embodiments, manipulator system 600, including IMU 660 and sensors 620, may provide information to processor 16 including the position and orientation of component 670.

In various embodiments, a component 670 may be secured to IMU 660 by a user. IMU 660 may be attached to gripper or stage 650, or may be placed in or on gripper or stage 650 by a user prior to attaching component 670, or may be coupled to component 670 before the component 670 and IMU 660 are together placed in or on gripper or stage 650. Manipulator system 600 may be used to manipulate component 670 in space in the field of view of sensor 12 in a coordinate system having, for example, three dimensions, such as a translational (x, y, z) coordinate system and/or a rotational or polar ($\rho$, $\theta$, $\phi$) coordinate system. The position and orientation of component 670 may be provided to processor and used, for example, in generating a 2D reference model from a 3D reference model by projections of the 3D reference model. Thus, the information from manipulator system 600 may be an input into processor 16, such as step 412 in FIG. 4.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for."

What is claimed is:

1. A damage detection system, comprising:
   a first sensor, wherein the first sensor includes a first two-dimensional sensor;
   a second sensor, wherein the second sensor includes an inertial measurement unit; and
   a tangible, non-transitory memory configured to communicate with a processor, the tangible, non-transitory memory having instructions stored thereon that, in response to execution by the processor, cause the processor to perform operations comprising:
   receiving, by the processor, a first data for a component from the first sensor;
   receiving, by the processor, a second data for the component from the second sensor;
   aligning, by the processor, the first data with a reference model;
   determining, by the processor, a feature dissimilarity between the first data and the reference model;
   classifying, by the processor, the feature dissimilarity; and
   determining, by the processor, a probability that the feature dissimilarity indicates damage to the component.

2. The damage detection system of claim 1, wherein the aligning, by the processor, the first data with the reference model further comprises:
   generating, by the processor, three-dimensional (3D) information from the first data, the 3D information corresponding to the component, and
   aligning, by the processor, the 3D information with the reference model.

3. The damage detection system of claim 2, wherein the reference model includes a three-dimensional (3D) reference model.

4. The damage detection system of claim 1, wherein the first sensor comprises a depth sensor.

5. The damage detection system of claim 1, wherein the reference model includes a two-dimensional (2D) reference model.

6. An article of manufacture including a non-transitory, tangible computer readable storage medium having instructions stored thereon that, in response to execution by a processor, cause the processor to perform operations comprising:
   receiving, by the processor, a first data for a component from a first sensor;
   receiving, by the processor, a second data for the component from a second sensor, wherein the second sensor includes an inertial measurement unit;
   aligning, by the processor, the first data with a reference model;
   determining, by the processor, a feature dissimilarity between the first data and the reference model;
   classifying, by the processor, the feature dissimilarity; and
   determining, by the processor, a probability that the feature dissimilarity indicates damage to the component.

7. The article of manufacture of claim 6, wherein the aligning, by the processor, the first data with the reference model further comprises:
   generating, by the processor, three-dimensional (3D) information from the first data, the 3D information corresponding to the component, and
   aligning, by the processor, the 3D information with the reference model.

8. The article of manufacture of claim 7, wherein the 3D information comprises at least one of a 3D point cloud, a model derived from the 3D point cloud, a focal stack, or a depth map.

9. The article of manufacture of claim 8, wherein the operations further comprise receiving, by the processor, a second data for the component from a second sensor, and wherein the generating the 3D information further comprises merging, by the processor, the first data and the second data.

10. The article of manufacture of claim 6, wherein the operations further comprise updating, by the processor, the reference model based on the feature dissimilarity.

11. A method of detecting damage to a component of an aircraft, comprising:
    receiving, by a processor, a first data for the component from a first sensor;
    receiving, by the processor, a second data for the component from a second sensor, wherein the second sensor includes an inertial measurement unit;
    aligning, by the processor, the first data with a reference model;
    determining, by the processor, a feature dissimilarity between the first data and the reference model;
    classifying, by the processor, the feature dissimilarity; and
    determining, by the processor, a probability that the feature dissimilarity indicates damage to the component.

12. The method of claim 11, wherein the aligning, by the processor, the first data with the reference model further comprises:
    generating, by the processor, three-dimensional (3D) information from the first data, the 3D information corresponding to the component, and
    aligning, by the processor, the 3D information with the reference model.

13. The method of claim 12, further comprising receiving, by the processor, a second data for the component from a second sensor, and wherein the generating the 3D information further comprises merging, by the processor, the first data and the second data.

14. The method of claim 13, wherein the 3D information comprises at least one of a 3D point cloud, a model derived from a 3D point cloud, a focal stack, or a depth map.

15. The method of claim 11, further comprising generating, by the processor, the reference model as a two-dimensional (2D) reference model based on a three-dimensional (3D) reference model and the second data from the inertial measurement unit.

16. The method of claim 11, further comprising updating, by the processor, the reference model based on the feature dissimilarity.

* * * * *